United States Patent
Ebenstein et al.

(10) Patent No.: US 6,195,620 B1
(45) Date of Patent: Feb. 27, 2001

(54) METHOD FOR DETERMINING A GEOMETRY OF A RAW CYLINDER HEAD CASTING AND DEVICE FOR CARRYING OUT SAME

(75) Inventors: Samuel Edward Ebenstein, Southfield, MI (US); Kevin Andrew Falk, Windsor (CA)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/129,515

(22) Filed: Aug. 5, 1998

(51) Int. Cl.[7] .............................. G06F 19/00; G06F 17/00
(52) U.S. Cl. ............................................ 702/156; 702/153
(58) Field of Search .................................... 702/156, 150, 702/152, 153; 33/503, 644, 645, 567, 567.1

(56) References Cited

U.S. PATENT DOCUMENTS

| | | |
|---|---|---|
| 4,774,751 * | 10/1988 | Pryor ........................................ 29/407 |
| 5,384,717 | 1/1995 | Ebenstein . |
| 5,442,572 | 8/1995 | Kiridena et al. . |
| 5,481,483 | 1/1996 | Ebenstein . |
| 5,647,704 * | 7/1997 | Turchan ................................ 409/131 |
| 5,659,493 * | 8/1997 | Kiridena et al. ....................... 364/578 |
| 5,805,289 * | 9/1998 | Corby, Jr. et al. .................... 356/376 |
| 5,864,777 * | 1/1999 | Smith et al. ............................ 702/156 |
| 5,987,591 * | 11/1999 | Jyumonji ................................. 712/93 |
| 6,069,700 * | 5/2000 | Rudnick et al. ....................... 356/359 |
| 6,073,056 * | 7/2000 | Gawronski et al. .................... 700/98 |

* cited by examiner

Primary Examiner—Patrick Assouad
(74) Attorney, Agent, or Firm—Jerome R. Drouillard

(57) ABSTRACT

A method for capturing data representative of a geometry of a raw cylinder head casting in order to obtain a casting scanning coordinate system for use with a machining coordinate system utilizes a locating device during a non-contact scanning operation. The cylinder head casting includes horizontal planar cast locators and vertical cast locators. Planar data corresponding to the planar cast locators is determined by scanning planar areas of the device. Vertical data corresponding to the vertical cast locators is determined utilizing locating features disposed on a planar surface of the device and located at predetermined positions with respect to the vertical cast locators. A transformation matrix defining a relationship between the scanning coordinate system and the machining coordinate system can then be determined based on the planar and vertical data so that virtual machining can be performed in predicting the volume of a machined cylinder head.

10 Claims, 3 Drawing Sheets

METHOD FOR DETERMINING A GEOMETRY OF A RAW CYLINDER HEAD CASTING AND DEVICE FOR CARRYING OUT SAME

CROSS-REFERENCE TO RELATED APPLICATIONS

This invention is related to pending application entitled "Method Of Predicting Volume Of Finished Combustion Chambers From A Raw Cylinder Head Casting," filed Jan. 21, 1997 and having Ser. No. 08/787,506, now U.S. Pat. No. 5,864,777 which is assigned to the same assignee as the present invention.

TECHNICAL FIELD

This invention relates to methods and devices for determining the geometry of a raw cylinder head casting for use in predicting volume of the chambers of a finished cylinder head.

BACKGROUND ART

A raw cylinder head casting is typically finished by machining the deck face and valve seat surfaces to prepare it for installation of spark plugs and valves. Variations in the volume of the combustion chamber have a strong effect on the variation of the compression ratio of the cylinder. Differences in compression ratio between cylinders of the same engine lead to engine noise vibration harshness (NVH). Differences in compression ratio among engines of the same family require using a less than optimum engine calibration for the engine, in order to meet emissions, which reduces power and adversely affects fuel economy. Thus, it is desirable to know and control the volume of a combustion chamber for a finished cylinder head.

The most common method for measuring the volume of a combustion chamber is to first perform the finish machining and then measure the volume of liquid required to fill the chamber. The method involves covering the combustion chamber with a glass plate having a small hole therethrough. The combustion chamber is carefully filled with liquid, which is accurately measured. This method only measures the volume of finished combustion chambers and is laborious and lacks repeatability. Further, this method will not work with an as cast cylinder head, since it requires a totally enclosed volume, i.e., the combustion chamber must contain both valves and spark plug. By being able to predict the finished volume soon after the time of casting, it is possible to adjust the casting process to repeatably produce the desired volume.

One known technique involves predicting the volume of a finished combustion chamber from a raw cylinder head casting as disclosed in "Method of Predicting Volume of Finished Combustion Chambers From a Raw Cylinder Head Casting," filed Jan. 21, 1997, having Ser. No. 08/787,506, now U.S. Pat. No. 5,864,777 the disclosure of which is hereby incorporated in its entirety. In this method, laser scanning is used to create a computer model of the cylinder head geometry. A computer technique called "virtual machining" is then used to emulate the real world machining process and transform the computer model of the raw casting to that of a finished combustion chamber. The volume of the computer model is calculated using numerical techniques.

Gathering data from a raw cylinder head casting utilizing laser scanning involves scanning the combustion chamber surfaces and cast locators, which are used for machining purposes. Laser scanning the cast locators, however, becomes difficult since some of the cast locators are positioned vertically to the deck face of the casting. Since these features are difficult to collect with a non-contact scanner, it is difficult to compute the transformation matrix utilized in the virtual machining process described above.

DISCLOSURE OF THE INVENTION

It is thus a general object of the present invention to provide a method and device for accurately gathering data representing the cylinder head geometry, including non-planar surfaces, utilizing non-contact scanning techniques.

In carrying out the above object and other objects, features, and advantages of the present invention, a method is provided for capturing data representative of a geometry of a raw cylinder head casting in order to obtain a casting scanning coordinate system for use with a machining coordinate system. The method includes determining planar data corresponding to planar cast locators disposed on the casting, determining vertical data corresponding to the vertical cast locators disposed on the casting utilizing planar locating features located at predetermined positions with respect to the vertical cast locators, and determining a transformation matrix defining a relationship between the scanning coordinate system and the machining coordinate system based on the planar and vertical data.

In further carrying out the above object and other objects, features, and advantages of the present invention, a device is also provided for carrying out the steps of the above described method. The device includes a planar surface having planar areas corresponding to the planar cast locators. The device also includes planar locating features disposed on the planar surface at predetermined positions with respect, to the vertical cast locators. The device rests on the surface of the raw cylinder head casting during a non-contact scanning so that planar and vertical data may be obtained for use in determining a transformation matrix which defines a relationship between the scanning coordinate system and the machining coordinate system.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
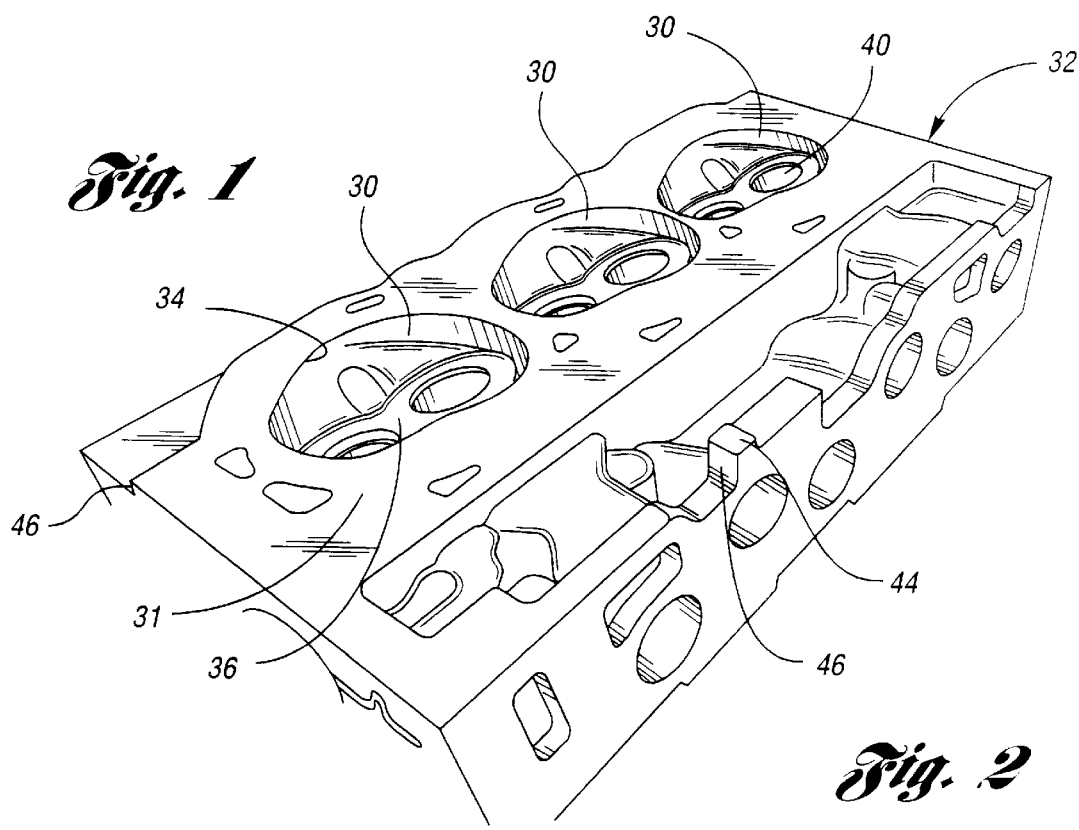
FIG. 1 is a perspective view of a raw cylinder head casting including horizontal and vertical cast locators.

Turning now to FIG. 1, there is shown a perspective view of a raw cylinder head casting. As illustrated in FIG. 1, the raw cylinder head casting 32 includes at least one cast combustion chamber 30 in a deck face 31. Each combustion chamber 30 has cast combustion chamber surfaces 34 and 36. Each combustion chamber 30 also has a recess 40 for at least one component such as a valve. It should be appreciated that the raw combustion chamber 30 is conventional and known in the art.

The raw cylinder head casting 32 also includes x,y locators, or planar cast locators, 44 and z locators, or vertical cast locators, 46, which are cast into the raw cylinder head casting 32 by a mold (not shown). The cast locators 44 and 46 define the orientation and position of a cast coordinate system, and are also utilized in as reference/starting points for the finished machining process.

Figure 2:
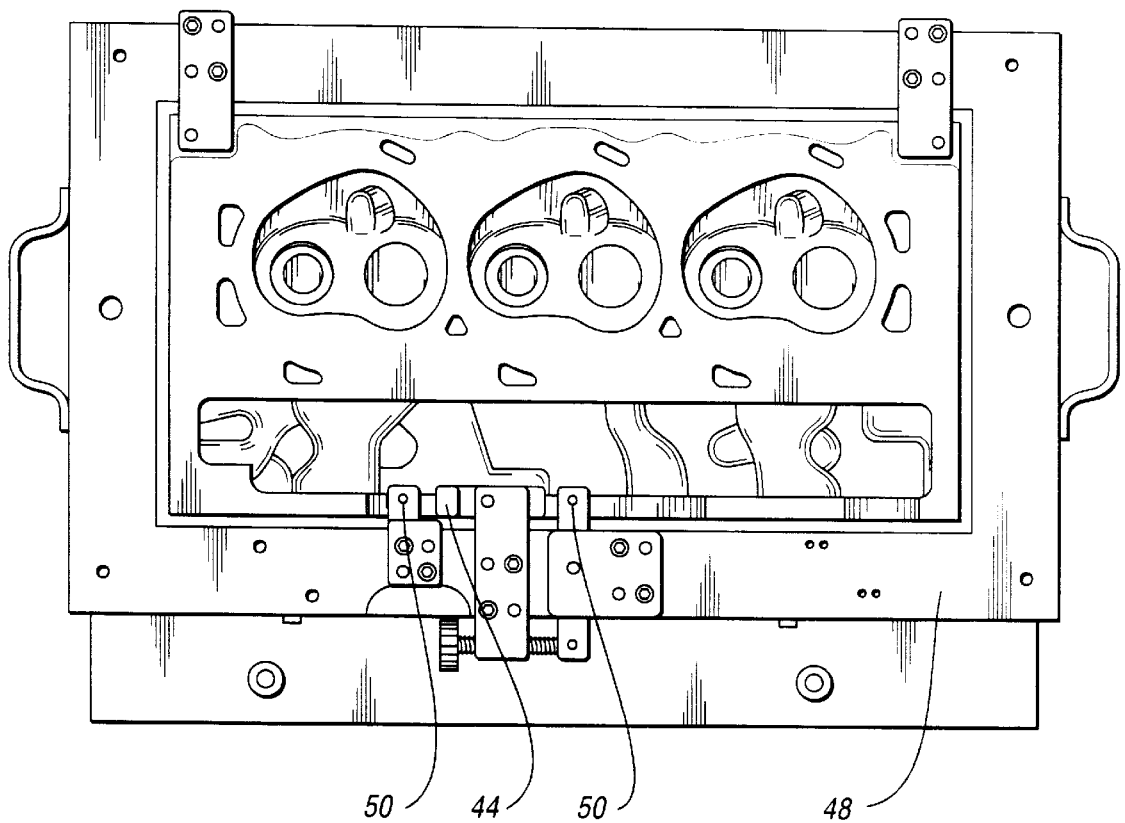
FIG. 2 is a perspective view of the device of the present invention placed on a raw cylinder head casting.

Turning now to FIG. 2, there is shown a perspective view of the device 48 of the present invention, which is used in obtaining the data capturing the geometry of the cylinder head. The device 48 is placed on top of raw cylinder head casting 32 so that the periphery of the device 48 is parallel to the planar cast locators 44 of the casting 32.

Figure 3:
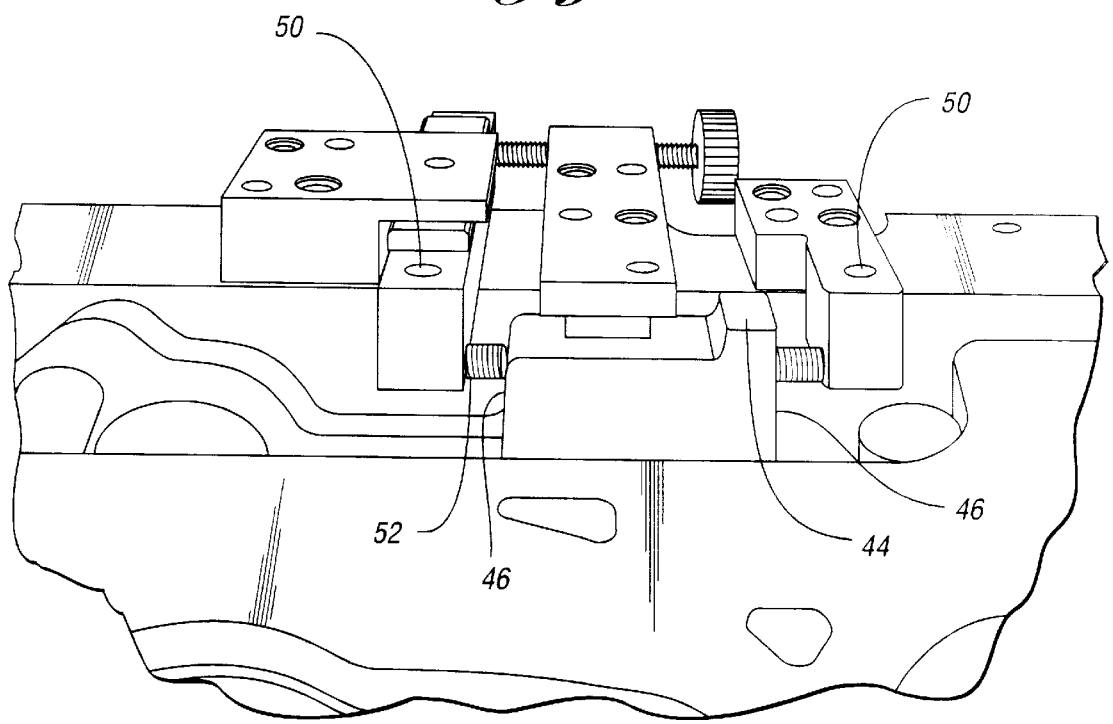
FIG. 3 is an isometric view of the device of the present invention illustrating the planar holes utilized to locate the vertical cast locators.
Figure 4:
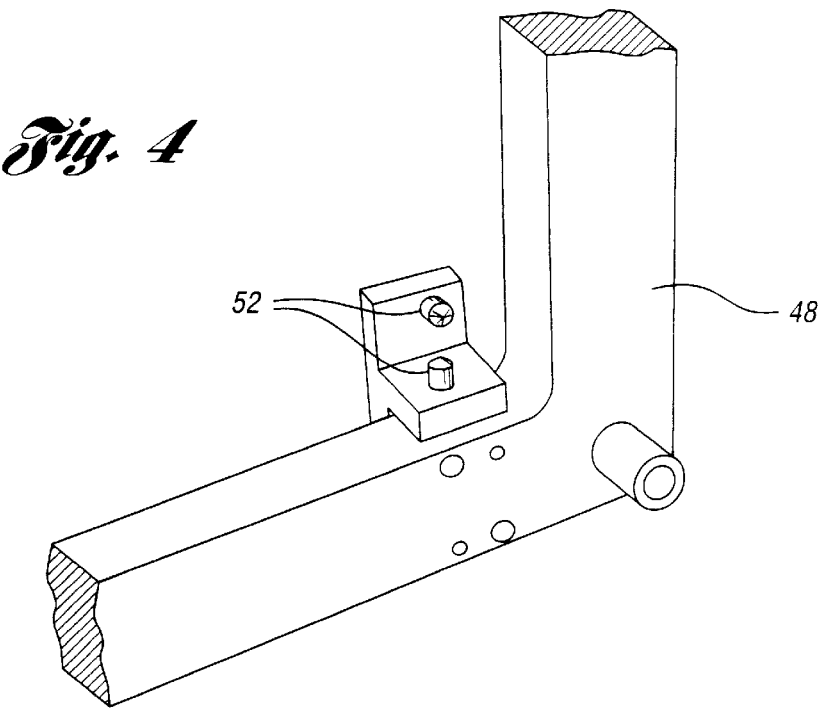
FIG. 4 is an isometric view of the device of the present invention illustrating the pins used to locate the vertical cast locators.

The device 48 also includes planar locating features, such as circular holes, 50 that are in a predetermined position with respect to the vertical cast locators 46. The holes 50 achieve the predetermined position via a pin 52 a few millimeters below the hole 50 that rests on the vertical face/surface of the vertical cast locator 46, as shown in FIGS. 3 and 4. Thus, the planar hole 50 has a predetermined size and shape in a predetermined positioned within an area of a block or segment of the device 48. The pin 52 then extends below and away from the block or segment a predetermined distance so that the hole is always in a predetermined planar position with respect to the vertical cast locator 46.

Now the cast locator features, both planar and vertical 44 and 46, can easily be scanned using non-contact scanning techniques. Also, the device 48 aligns itself with the cast locators 44, 46 in the same manner as a machine tool aligns the raw casting 32 for cylinder head machining thereby insuring that the same points on the casting 32 are used for virtual machining and also for physical machining.

Figure 5:
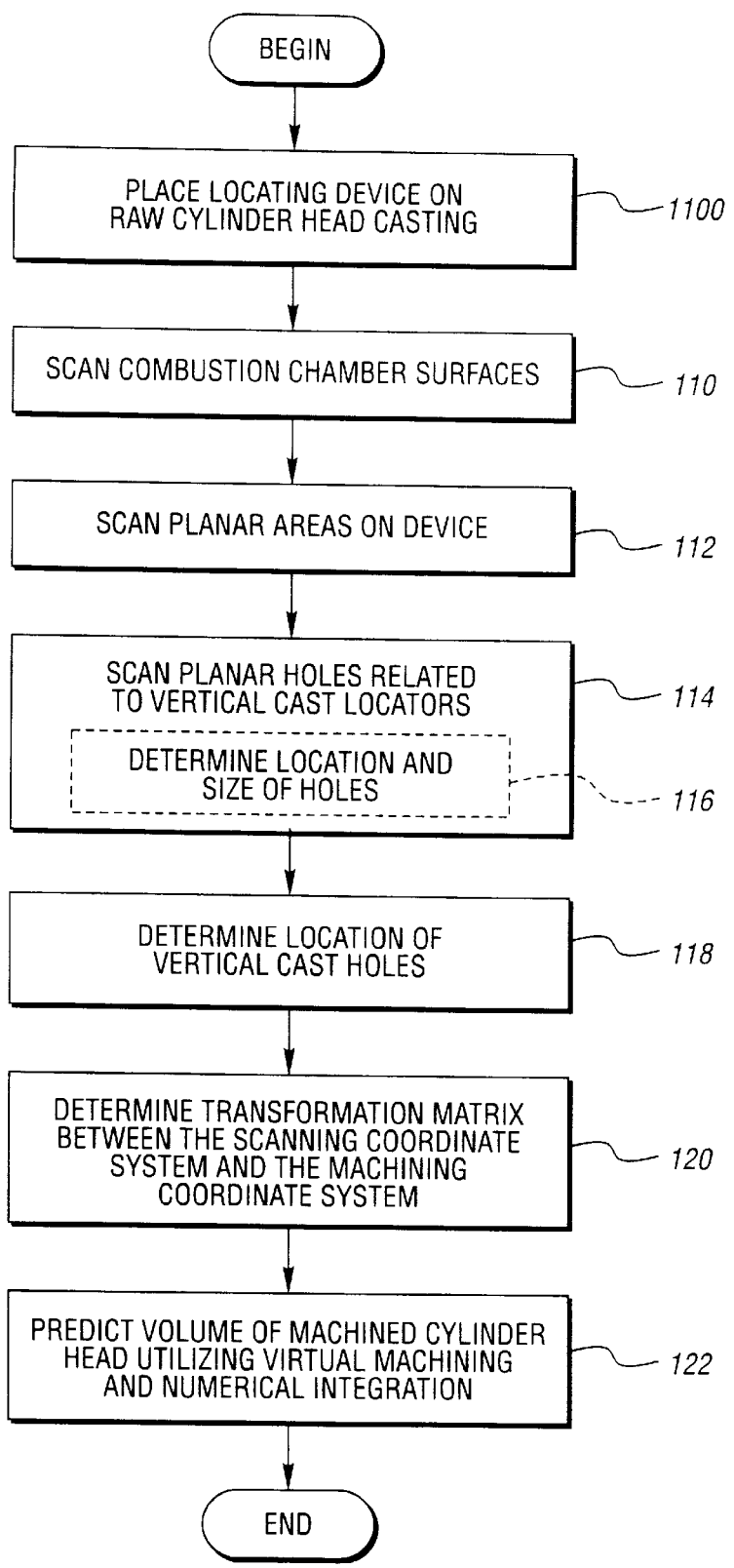
FIG. 5 is a flow diagram illustrating the general sequence of steps associated with the operation of the present invention.

A flow diagram illustrating the general sequence of steps associated with method of the present invention is shown in FIG. 5. The method begins with the step of placing the device 48 on the raw casting 32, as shown at block 100. Next, at block 110, the combustion chamber surfaces 34, 36 are scanned in order to determine the geometry of the combustion chambers. A laser scanner or other suitable means may be used to collect a dense cloud of x,y,z data points which represent the geometry of the cast combustion chamber surfaces, 34, 36, 40, 42. For example, a laser scanner can be used to collect a cloud of x,y,z data points every 0.5 millimeters (mm) in both the x and y directions across the raw combustion chamber 30. This dense cloud of point data is used as an input to a computer (not shown) for the purpose of volume calculation. In this example, the scan density is sufficient to compute the volume to within 0.05 cubic centimeters (cc). It should be appreciated that laser scanning and inputting to a computer is conventional and known in the art.

The method proceeds to determine planar data corresponding to the planar cast locators 44 by scanning at least three planar areas on the device 48, as shown at block 112. At least three planar areas are needed in order to define the deck face XY plane. The planar areas scanned are preferably located on the periphery of the device 48 and must lie in a plane parallel to the planar cast locators 44.

At block 114, vertical data corresponding to the vertical cast locators 46 are determined by scanning the planar holes 50 related to the vertical cast locators 46. Since the holes 50 are located at a predetermined position with respect to the vertical cast locators 46, the location of the vertical cast locators 46 can be determined, block 118, so that the direction and origin of the deck face XY plane can be determined.

Before determining the location of the vertical cast locators 46, an optional double-check step may be performed, as illustrated at block 116. Since the size of each hole 50 is known before scanning, the measured radius can be compared to the known radius to provide a way of insuring that the data taken from the device 48 is accurate. Experiments have shown that computing the proper radius of the hole 50 is more sensitive to errors in data collection than in computing the center of the hole. Thus, the radius comparison is a good barometer of the determination of hole location accuracy. The size of the holes can be measured utilizing non-contact methods as disclosed in U.S. Pat. No. 5,384,717 issued to Ebenstein and entitled "Non-Contact Method of Obtaining Dimensional Information About An Object," and U.S. Pat. No. 5,481,483 also issued to Ebenstein and entitled "Non-Contact Method Of Obtaining Dimensional Information About An Object For Comparing Similar Objects."

Now that all the data is gathered, the method proceeds to determine a transformation matrix defining the relationship between the scanning coordinate system and the machining coordinate system, as shown at block 120. The cast locators 44 and 46 are used in the first steps of the machining process to locate the machining datums to which all further machining is done. The relationship between the cast coordinate system and the machining coordinate system is defined by cylinder head drawings or a computer aided drafting (CAD) model of the cylinder head. The transformation matrix between the scanning coordinate system and the machining coordinate system can be derived from this given relationship.

Finally, the volume of a machined cylinder head utilizing virtual machining can be determined, as shown at block 122.

The following tables gives the results of four trials using the device 48 for a 3.8L engine to compute chamber volume:

| Chamber # | Trial 1 | Trial 2 | Trial 3 | Trial 4 |
|---|---|---|---|---|
| 1 | 66.799 | 66.931 | 66.694 | 66.701 |
| 2 | 66.880 | 67.050 | 66.865 | 66.869 |
| 3 | 66.570 | 66.739 | 66.556 | 66.560 |

Trials 1, 3 and 4 represent normal production type runs. In trial 2, a washer of about 10 mm in thickness was placed under one end of the chamber to simulate a "worst case" condition. In trial 2, some of the chamber was not visible to the scanner, which may account for a somewhat larger variation between the results of this trial and the other trials. In trials 3 and 4, the casting was not removed from the fixture so these trials check repeatability of the system without regard to the device (roughly 0.005 cc in volume). The results of trials 1, 3 and 4 show that the volume varies by roughly 0.10 cc. If trial 2 is also included as a worst case, the variability goes up to about 0.15 cc maximum.

While the best modes for carrying out the invention have been described in detail, those familiar with the art to which this invention relates will recognize various alternative designs and embodiments for practicing the invention as defined by the following claims.

What is claimed is:

1. A method for capturing data representative of a geometry of a raw cylinder head casting in order to obtain a casting scanning coordinate system for use with a machining coordinate system, the cylinder head casting including horizontal planar cast locators and vertical cast locators, the method comprising:

determining planar data corresponding to the planar cast locators;

determining vertical data corresponding to the vertical cast locators utilizing planar locating features located at predetermined positions with respect to the vertical cast locators; and determining a transformation matrix defining a relationship between the scanning coordinate system and the machining coordinate system based on the planar and vertical data.

2. The method as recited in claim 1 wherein determining the planar data comprises scanning a plurality of areas parallel to the planar cast locators.

3. The method as recited in claim 2 wherein the raw cylinder head casting includes cylinder chamber surfaces and wherein determining the planar data further comprises scanning the cylinder chamber surfaces.

4. The method as recited in claim 1 wherein determining the vertical data comprises scanning the planar locating features.

5. The method as recited in claim 4 wherein determining the vertical data comprises determining a location of each of the vertical cast locators based on the vertical data and the predetermined positions of the planar locating features.

6. The method as recited in claim 5 wherein determining the location of each of the vertical cast locators comprises determining a location of each of the planar locating features.

7. A device for capturing data representative of a geometry of a raw cylinder head casting in order to obtain a casting scanning coordinate system for use with a machining coordinate system, the cylinder head casting including horizontal planar cast locators and vertical cast locators, the device comprising:

a planar surface having planar areas corresponding to the planar cast locators; and locating features disposed on the planar surface at predetermined positions with respect to the vertical cast locators;

wherein the device rests on the surface of the raw cylinder head casting during a non-contact scanning so that planar and vertical data may be obtained for use in determining a transformation matrix which defines a relationship between the scanning coordinate system and the machining coordinate system.

8. The device as recited in claim 7 wherein each of the locating features comprises holes having a predetermined size and being located at one of the predetermined positions when a pin associated with each of the objects rests against a vertical wall of the vertical cast locator.

9. The device as recited in claim 8 wherein the pin extends below the locating features a first predetermined distance and extends away from the locating features towards the vertical wall a second predetermined distance.

10. The device as recited in claim 7 wherein the locating features are circular holes having a predetermined diameter.

* * * * *